United States Patent [19]

Aldenhoven

[11] 4,307,426

[45] Dec. 22, 1981

[54] AZIMUTH ANGLE ADJUSTING DEVICE FOR A TAPE PLAYER

[75] Inventor: Ghislanus M. A. M. Aldenhoven, Eindhoven, Netherlands

[73] Assignee: U.S. Philips Corporation, New York, N.Y.

[21] Appl. No.: 103,669

[22] Filed: Dec. 14, 1979

[30] Foreign Application Priority Data

Jan. 16, 1979 [NL] Netherlands ............................ 7900325

[51] Int. Cl.³ ........................... G11B 5/56; G11B 21/24
[52] U.S. Cl. ........................................ 360/109; 360/76
[58] Field of Search .......................... 360/109, 104–107, 360/76, 75

[56] References Cited

U.S. PATENT DOCUMENTS

| | | | |
|---|---|---|---|
| 3,521,007 | 7/1970 | Laghaie | 360/101 X |
| 3,539,191 | 11/1970 | Yamamoto | 360/106 |
| 3,558,141 | 1/1971 | Suzuki | 360/109 |
| 3,820,159 | 6/1974 | Saunders | 360/106 |

FOREIGN PATENT DOCUMENTS 1455434  11/1976  United Kingdom ............... 360/106

*Primary Examiner*—John H. Wolff
*Attorney, Agent, or Firm*—David R. Treacy

[57] ABSTRACT

A cassette player or recorder having a device for adjusting the azimuth angle of a read head during playback. An azimuth angle adjusting member is controlled by two pulling strings for moving the member in opposite directions, the strings being separately tensioned, and being moved by a correction knob on the front panel of the apparatus.

6 Claims, 9 Drawing Figures

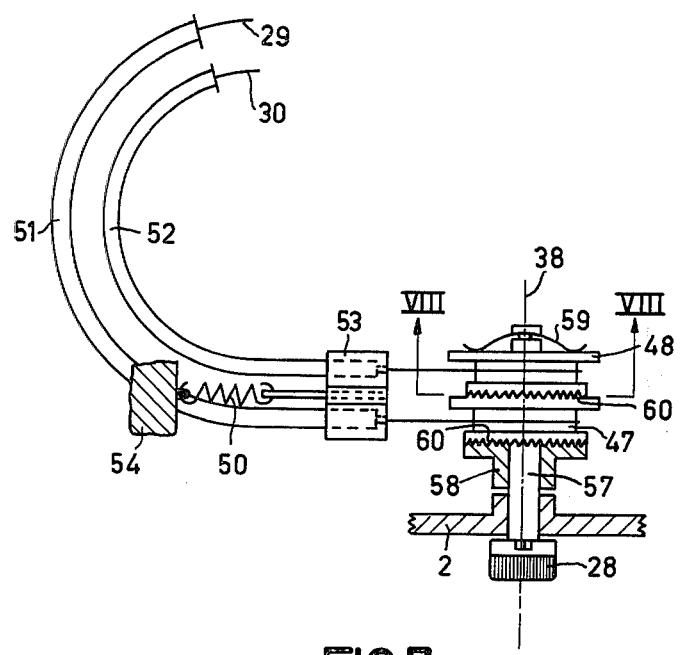
FIG.7
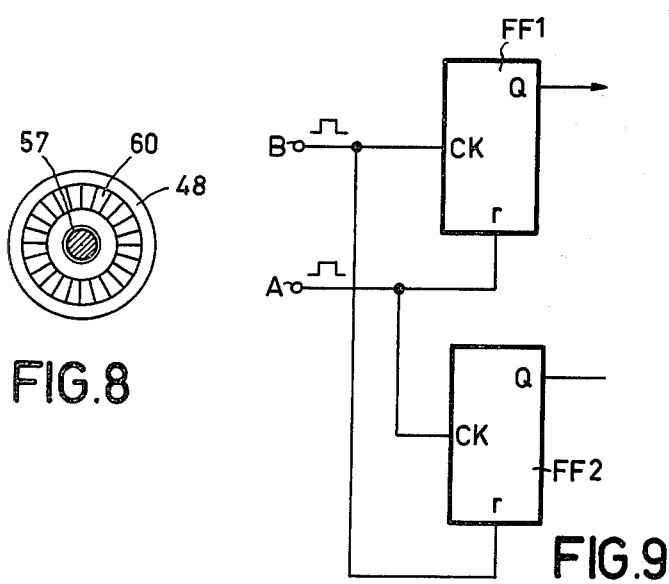
FIG.8
FIG.9

AZIMUTH ANGLE ADJUSTING DEVICE FOR A TAPE PLAYER

BACKGROUND OF THE INVENTION

The invention relates to an apparatus for reproducing magnetic signals recorded in tracks on a magnetic tape, hereinafter referred to as a tape player or tape recorder, comprising: a frame with a front panel; a magnetic read head with a magnetic core having pole pieces between which a read gap is formed for scanning the magnetic signals on the magnetic tape; as well as an azimuth-angle correction device for correcting an incorrect azimuth-angle position of the read gap relative to a track on the magnetic tape and more particularly to such a device comprising a pivoting plate, which carries the magnetic head and which is pivotable relative to the frame for influencing the azimuth-angle position of the read gap by pivoting the pivoting plate, and a movable pivoting member, which cooperates with the pivoting plate for pivoting the pivoting plate when the member is moved.

When reproducing magnetic signals recorded in tracks on a magnetic tape it is essential that during reproduction the correct angular position of the read gap of the read head relative to the selected track is maintained. An incorrect angular position of the read head results in high frequencies of a signal recorded by means of a magnetic write head not being reproduced in an optimum manner. The write head also has a magnetic core with pole pieces between which a write gap is formed. The position of the write gap determines the orientation of the magnetic signals recorded on the magnetic tape. The write gap and read gap should therefore have the same angular position, as closely as possible.

A deviation of only a few minutes of arc from the correct angular position of the read gap may lead to the high-frequency reproduction of an audio signal being deteriorated by a few KHz. This problem may inter alia occur when the signals have been recorded on the magnetic tape with an apparatus other than that with which the magnetic tape is played back. In order to reduce the resulting interchangeability problems, it is therefore necessary that different apparatuses have a corresponding adjustment of the neutral position of the two magnetic heads.

It is obvious that in practice the accuracy of this neutral adjustment cannot surpass what is feasible and efficient in production. However, even in the case of correctly adjusted apparatus it happens that the reproduction of signals which have been recorded by means of another apparatus, for example the reproduction of commercially available prerecorded compact cassettes, the so-called music cassettes, is not optimum, because either the neutral adjustment of the write gap of the write head used during recording or the adjustment of the read gap of the read head of the tape player is not optimum, for example because as a result of shocks or mistreatment of the write head, the read head or both heads does or do not have the correct position. In such a case a substantial improvement in reproduction quality can be obtained by slightly readjusting the read head of the tape player, so as to ensure that the read gap of the read head is, as much as possible, parallel to the write gap of the write head used for recording the tracks and thus to the orientation of the tracks on the magnetic tape. This improved reproduction especially manifests itself in an audible improvement of the treble reproduction.

In several known tape players the read head, which serves for reproducing the recorded magnetic signals, is mounted on the frame so as to be adjustable. The read head is secured to a plate which is supported by the frame in such a way that the azimuth angle can be changed with the aid of a set screw. During manufacture this set screw enables the neutral position of the read gap to be adjusted within the required tolerance range with the aid of a screwdriver. It is evident that such an azimuth-angle correction device is less suitable to be operated by a user during the reproduction of music, because in this situation the player is connected to the mains voltage and, moreover, the relevant read head is covered by the front panel of the apparatus. Especially in the case of Compact-Cassette recorders provided with a hinged cassette holder in which the cassette is inserted before it is swung into an operating position, there is not much room near the read head.

SUMMARY OF THE INVENTION

It is the object of the invention to provide a tape player having an azimuth angle correction device which a user can operate easily while listening to the music which is reproduced. The invention is characterized in that at a location on the frame which is readily accessible by hand there is provided a manually operated adjustable correction knob, which is connected by a flexible transmission member to the pivoting member for moving the pivoting member by adjusting the correction knob over a certain distance, this movement then affecting the read head via the pivoting plate. The use of a flexible transmission member provides a higher degree of freedom in respect of the location of the correction knob on the front panel of the player.

Obviously, it is of importance that the correction knob is most rigidly connected to the pivoting plate for the read head and that there is no lost motion in the transmission between the correction knob and the pivoting plate. In this respect an embodiment is of interest which is characterized in that the movable pivoting member is provided with a pivoting cam which cooperates with the pivoting plate and that there are provided resilient means for urging the pivoting cam and the pivoting plate against each other so as to eliminate any clearance between them. Furthermore, an embodiment may be used which is characterized in that the movable pivoting member is rotatable, at least to a limited extent; that two flexible transmission members, in the form of two pulling strings, are each rigidly connected to the correction knob, directly or indirectly, with a first end and are rigidly connected to the rotatable pivoting member, directly or indirectly, with a second end; and that resilient means are provided for tensioning the two pulling strings between their two rigidly connected ends, so as to prevent slackening of the pulling strings and consequent loss of motion in the azimuth-angle correction device.

In order to realise a suitable transmission ratio between the rotation of the correction knob on the front panel and the pivotal movement of the pivoting plate an embodiment is of interest which is characterized in that the correction knob is mounted on the front panel of the apparatus so as to be rotatable about a first axis; that near their first ends the two pulling strings are each wound onto a first drum for at least a part of one turn in a sense opposite to each other, this drum being coaxially connected to the correction knob; that the rotatable pivoting member comprises a gear segment which is rotatable about a second axis, the gear segment meshing with a pinion which is rotatable about a third axis which is spaced from the second axis; and that near their second ends the two pulling strings are each wound onto a second drum for at least a part of one turn in a sense opposite to each other, the second drum being coaxially connected to the pinion. An additional advantage of this embodiment is that it permits the use of further steps which serve to ensure that the neutral position of the read gap of the read head corresponds to a neutral position of the correction knob on the front panel. To this end it is advantageous to use a further embodiment which is characterized in that the correction knob is mounted on a spindle which is rotatable about the first axis, that the spindle carries a disc, which is rigidly connected thereto and which is coaxial with the first axis, that the two first drums, which are coaxial with the first axis, are axially movable on the spindle, that there are provided resilient means for urging confronting end-surfaces of the disc and the two first drums against each other in the axial direction, and that these confronting end-surfaces are provided with radially directed ridges for coupling the end surfaces to each other in the direction of rotation, so as to enable the drums to be rotated relative to each other and relative to the said disc, after a slight axial displacement over a distance which is at least equal to the height of said ridges, so as to obtain a neutral setting of the correction knob when the read gap of the read head is in a neutral position.

The invention will now be described in more detail with reference to the drawing.

BRIEF DESCRIPTION OF THE DRAWINGS

FIG. 7 is a view, partly in cross-section, at the correction knob and a number of associated components, FIG. 8 is a view in accordance with the arrows VIII—VIII in FIG. 7, and FIG. 9 shows a block diagram of an electronic circuit for signalling an incorrect azimuth-angle position of the read gap of the read head.

DESCRIPTION OF THE PREFERRED EMBODIMENTS

Figure 1:
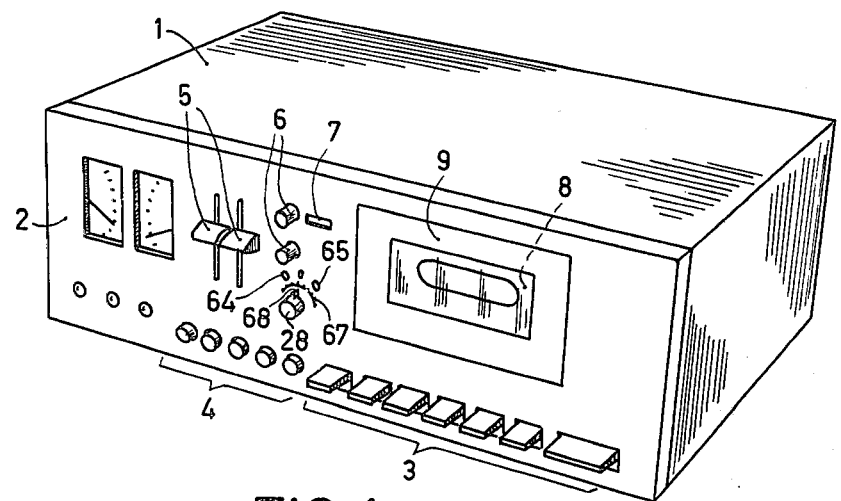
FIG. 1 is an elevation of a magnetic-type cassette recorder with a correction knob for an azimuth-angle correction device at the front panel.

The apparatus shown in FIG. 1, a cassette recorder suitable for Compact Cassettes, comprises a housing 1 having a front panel 2 at the front side. At the front panel a number of controls 3 are located for the actuation of the tape transport of the cassette recorder, a number of buttons 4 for controlling electrical functions of the cassette recorder, two slide potentiometers 5 for adjusting the gain of the two channels of a built-in stereo amplifying-unit, and two buttons 6 for the actuation of a counter 7. A magnetic tape cassette 8 is inserted in a pivotable cassette holder 9, which in FIG. 1 is in a closed position. For the insertion of a cassette into the cassette apparatus and for removing a cassette from the cassette apparatus, the cassette holder 9 can be brought in a swung-open position, not shown.

Figure 2:
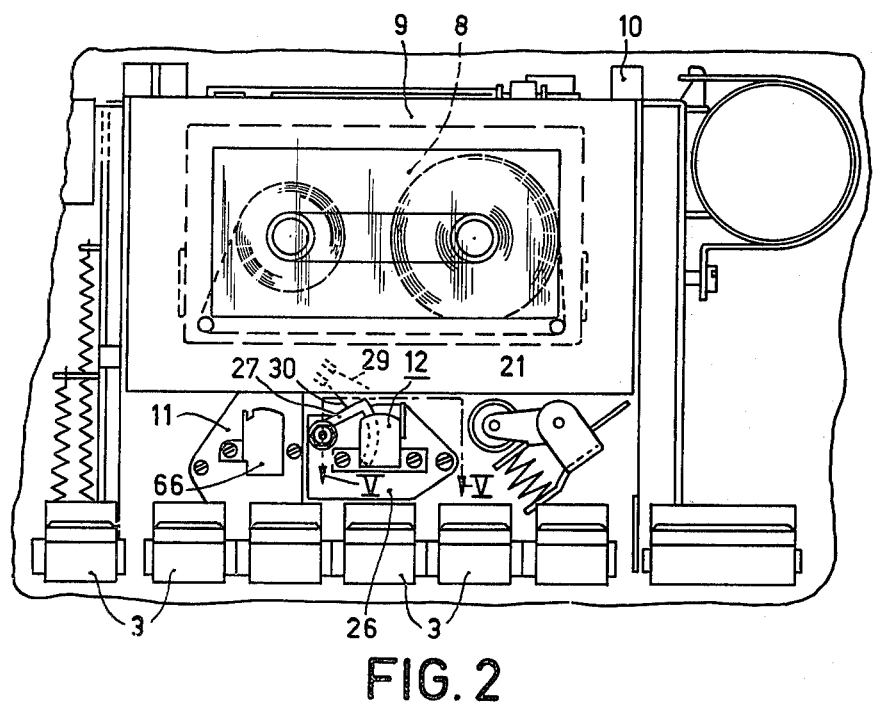
FIG. 2 shows a front view of a part of the cassette recorder of FIG. 1 at the location of a cassette holder and a write/read head, with the front panel removed.

FIG. 2 shows the part of the frame 10 on which the cassette holder 9 is mounted. On the frame a head plate 11 is movably journalled, which plate accommodates a combined write/read head 12 as well as an erase head 66. The cassette is of fully conventional construction, and components which are irrelevant for the present invention will not be discussed.

Figures 3, 4:
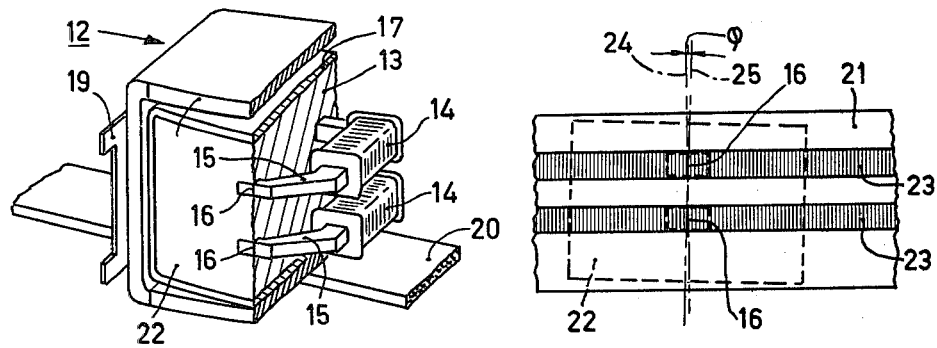
FIG. 3 is a perspective view partly in cross section of a conventional magnetic write/read head.
FIG. 4 shows a length of tape with an indication of the magnetic signals recorded in two tracks, the head face of the magnetic write/read head of FIG. 3 being projected on the magnetic tape.

FIG. 3 is a perspective view of the conventional magnetic write/read head 12 on an enlarged scale, some parts of the magnetic head being omitted so as to show its interior. Two magnetic circuits are embedded in a compound 13, each circuit comprising two magnetic cores 14 wound from electrically conducting wire and two C-shaped laminated pole pieces 15. In each of the magnetic circuits a gap 16 is formed between two such pole pieces, which during reproduction serves as the read gap. The actual magnetic head 17 is surrounded by a metal screening 18, to which on one side a tape guide member 19 is secured. The screening is connected to a resilient strip 20. The write/read head shown is of fully conventional construction and is therefore neither discussed in more detail. The cassette 8 contains a magnetic tape 21 which during reproduction is brought into contact with the front of the magnetic head unit 12, that is, with the so-called head face 22.

The magnetic signals recorded on the magnetic tape 21 and read with the aid of the magnetic head 12 consist of locally magnetized areas in the magnetic-tape material, which chiefly extend in the direction of the read gap 16, in two tracks. A deviation of the direction of these magnetized areas relative to the direction of the read gap is termed an azimuth angle error. This is schematically shown in FIG. 4. A length of magnetic tape 21 contains tracks 23. The orientation of the magnetic areas, schematically represented by vertical lines in FIG. 4, is symbolized by a line 24. The head face 22 of the magnetic head 12 is projected onto a length of magnetic tape 21. A line 25 extends in line with the two head gaps 16. The lines 24 and 25 enclose an angle $\phi$. This is the azimuth-angle, which in ideal conditions should have the value zero for an optimum reproduction of the signals in the tracks 23, in particular in respect of the reproduction of higher frequencies.

The azimuth-angle correction device for correcting an incorrect azimuth-angle position of the read gap 16 relative to the magnetic signals on the magnetic tape 21 comprises a pivoting plate 26 which carries the magnetic head 12 and which is pivotable relative to the frame 10, for influencing the azimuth-angle position of the read gap 16. This may be effected by pivoting the pivoting plate. The azimuth-angle correction device furthermore comprises a movable pivoting member 27 which cooperates with the pivoting plate 26 to cause the pivoting plate 26 to be pivoted when the member 27 is moved.

On the front panel 2 of the cassette recorder at a readily accessible location a manually adjustable correction knob 28 is provided which is connected to the pivoting member 27. The pivoting member can be moved by moving the correction knob. In order to transmit the movements of the correction knob 28 over a certain distance to the pivoting member 27 and via the pivoting plate 26 to the read head 12, the azimuth-angle correction device comprises two flexible transmission members in the form of two steel pulling strings 29 and 30 between the pivoting member 27 and the correction knob 28.

Figure 5:
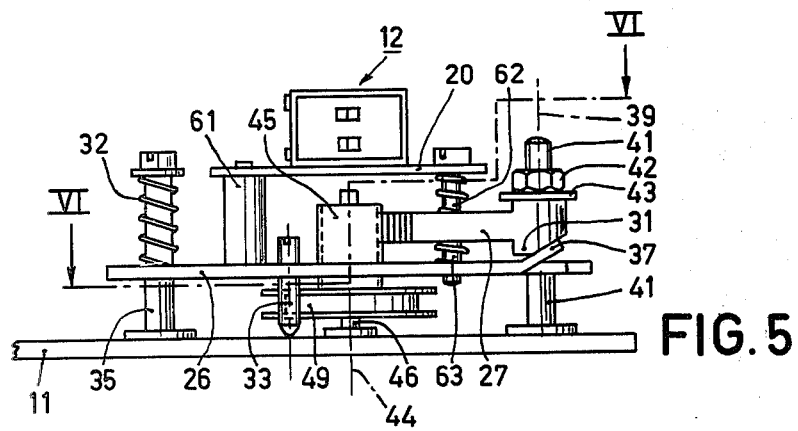
FIG. 5 is a view in accordance with the arrows V—V in FIG. 2.
Figure 6:
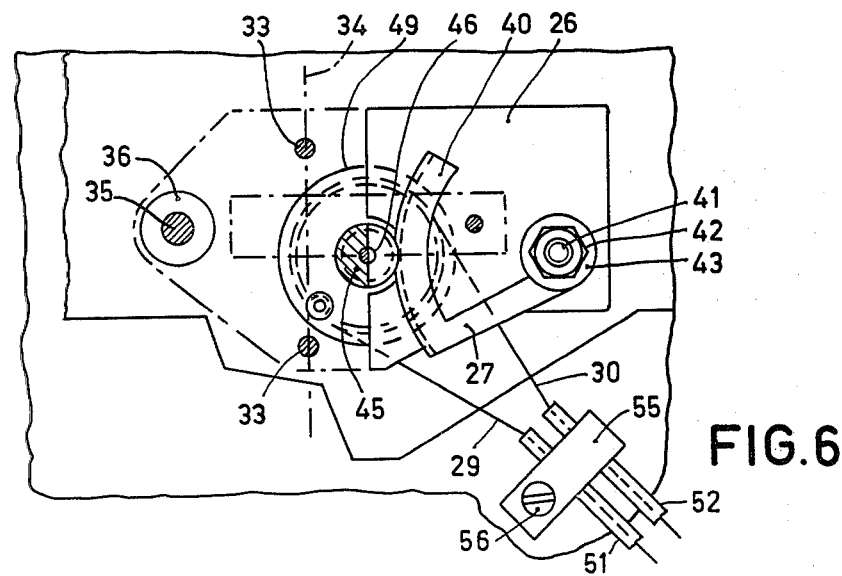
FIG. 6 is a view in accordance with the arrows VI—VI in FIG. 5.

The movable pivoting member 27 is provided with a pivoting cam 31 which cooperates with the pivoting plate 26, see FIG. 5. For urging the pivoting cam 31 and the pivoting plate 26 against each other and thus eliminating any clearance between them there is provided a pressure spring 32. On the underside the pivoting plate 26 has two pivoting pins 33 which have free ends that bear on the head plate 11. Thus the pivoting plate is pivotable about a line 34, see FIG. 6, which connects the two points where the pivoting pins 33 contact the head plate. A bolt 35 projects through a hole 36 in the pivoting plate 26 and is secured in the head plate 11. The pressure spring 32 is fitted around the bolt 35 and exerts pressure on the pivoting plate 26 at a location which is situated to the left of the pivoting pins 33. As a result of this the pivoting plate 26 is urged against the pivoting cam 31 at a location to the right of the pivoting pins 33, i.e. at the location of a bent tab or cam follower 37.

The correction knob 28 is rotatable about an axis of rotation 38. The rotatable pivoting member 27 is rotatable to a limited extent about another axis, namely an axis 39, and is provided with a gear segment 40. The pivoting member is journalled on a pin 41 on the head plate 11, which pin has a threaded portion at its free end onto which a nut 42 and washer 43 are fitted, which press on the pivoting member 27. By means of the nut 42 the height of the pivoting member on the pin 41 can be adjusted, thus permitting the initial position of the pivoting plate 26 to be adjusted. The gear segment 40 meshes with a pinion 45 which is rotatable about an axis 44 at some distance from the axis 41. This pinion is rotatably journalled on a pin 46 which is secured to the head plate 11. The two pulling strings 29 and 30 are wound onto two first drums 47 and 48 respectively for at least a part of a turn in a mutually opposed sense, the drums being coaxially connected to the correction knob 28. Near their other ends the two pulling strings are wound onto a drum 49 for at least part of a turn in a mutually opposite sense; this second drum 49 is coaxial and integral with the pinion 45. Thus, the two pulling strings 29 and 30 are connected directly to the correction knob 28 and indirectly, via the pinion 45, to the pivoting member 27.

In order to prevent slackening of the pulling strings 29 and 30 and thus the occurrence of lost motion in the azimuth-angle correction device, a tension spring 50 tensions each of the two pulling strings at one end. The pulling strings extend in flexible tubes 51 and 52 over a part of their lengths. Nearer the correction knob 28 the ends of the flexible tubes 51 and 52 are inserted in a plastic holder 53, to which an end of the tension spring 50 is attached. The other end of the tension spring 50 is connected to a stationary part 54 of the cassette-recorder frame. Nearer the read head the flexible tubes 51 and 52 are secured to the head plate 11 with the aid of a bracket 55 and a screw 56.

The correction knob 28 is mounted on a spindle 57 which is rotatable about the axis 38. A disc 58 is rigidly connected to this spindle and is coaxial with the axis 28. The two drums 47 and 48 are movable over the spindle 57. The confronting end-surfaces of the disk 58 and the drums 47 and 48 are axially urged against each other with the aid of a leaf spring 59 which is secured to the spindle 57. These confronting end-surfaces are provided with radially extending ridges 60 for coupling the end surfaces to each other in the direction of rotation, see FIG. 8. Thus, in order to obtain a neutral setting of the correction knob 28 when the read gaps 16 of the read head 12 are in their neutral positions, the drums 47 and 48 can be rotated relative to each other and relative to the disc 58, after a slight axial displacement over a distance which is at least equal to the ridges, against the force of the leaf spring 59.

In the embodiment shown, see FIG. 5, the write head 12 is mounted on a resilient strip 20 in the usual manner, which strip enables the azimuth-angle of the magnetic head to be adjusted. At one end the resilient strip 20 is secured to a fixed post 61 and near its other end it is adjustable in the usual manner with the aid of a screw 62, against the action of a pressure spring 63. The embodiment shown uses a magnetic head which is in fact intended for conventional cassette recorders which are normally not provided with a manually adjustable azimuth-angle correction device. Thus, it is possible to mount a magnetic head on the pivoting plate 26 in a different manner, namely by directly mounting the magnetic head rigidly on said plate.

Above the correction knob 28 two lamps 64 and 65 are located on the front panel, which for example comprise so-called LED's (light emitting diodes). If one of the two lamps 64 or 65 lights up, this means that the azimuth angle of the read head is not correct. The user of the apparatus can now correct the azimuth-angle error by turning the correction knob 28 in a direction which is opposed to the direction indicated by the lamp that is lit. The azimuth angle error is within the permissible tolerance limits if neither of the two lamps lights up. FIG. 9 shows a simplified block diagram of an electronic circuit for measuring the azimuth angle and causing the lamps 64 and 65 to light up in the case of an excessive azimuth angle error. For the use of the circuit shown it is necessary to employ a read head which per track, in contradistinction to the read head shown in FIG. 3, has a split pole piece for separately scanning an upper half and a lower half of the track. The difference in time between two associated zero passages of the scanned signals is measured and is a measure of the angular position of the read gap. For a more comprehensive discussion of this method of measuring the angular position of a read head as well as the electronic circuits for correcting the angular position of the read head reference is made to the non-published U.S. Pat. Application Ser. No. 41,673 herein incorporated by reference. A suitable read head is described in the non-published U.S. Pat. Application Ser. No. 41,674, also incorporated by reference.

FIG. 9 shows a phase detector to which signals A, obtained from the upper half of the track being scanned, as well as a signal B, obtained from the lower half of the track being scanned, are applied. The phase detector comprises two bistable multivibrators FF1 and FF2 with two inputs. The bistables are set by a falling edge of a signal on the one input and are reset or kept reset by a low level on the second input. The signal A is applied to the reset input r of the bistable FF1 and to the set input ck of the bistable FF2. The signal B is applied to the reset input r of the bistable FF1 and to the set input ck of the bistable FF2. If the zero passage of the signal from the upper half of the track arrives first, the bistable FF2 will be set and will subsequently be reset by the signal from the upper half of the track whose zero passage appears later. As the bistable FF1 is kept reset no pulse can appear on its output, and on the Q-output of the bistable FF2 a pulse does appear. However, if the zero passage of the signal B arrives sooner, the bistable FF1 is set and subsequently reset by the zero passage of the zero A from the upper half of the track, so that a pulse appears on the Q-output of bistable FF1. In this case no pulse can appear on the Q-output of bistable FF2. The pulse on the output of the bistable FF1 is utilized to make the lamp 64 light up and the signal on the output of the bistable FF2 is utilized to make the lamp 65 light up.

Obviously the write/read head 12 should accurately be restored to the neutral position during a recording. Around the correction knob 28 a distinct scale graduation 67 is provided with an indication of the neutral position. The correction knob 28 itself has a pointed projection 68, which in the neutral position is situated against a central mark of the scale graduation.

Although the embodiment described employs two pulling strings, embodiments are conceivable within the scope of the invention which employ different types of flexible transmission members, such as a chain, a flexible shaft, a bowden cable, a completely or locally flexible strip, etc. It is very important to choose a transmission member which has a high rigidity in its direction of movement, because otherwise the write/read head cannot accurately be returned to the neutral position.

I claim:

1. A magnetic tape player, comprising:
   a frame having an accessible location for controls,
   a magnetic read head, and
   means for mounting the magnetic read head for scanning magnetic signals on magnetic tape in the player, said mounting means including an azimuth-angle correction device for correcting an incorrect azimuth-angle position of the read head relative to a track on the magnetic tape, said correction device comprising a pivoting plate mounted pivotably relative to said frame, the magnetic head being carried on the pivoting plate and arranged so that pivoting of the plate affects the azimuth-angle position of the head, and a movable pivoting member arranged for pivoting said plate responsive to movement of said member,
   characterized in that the azimuth-angle correction device further comprises a manually operable correction knob movably mounted to said frame at said accessible location,
   two transversely flexible tension members each having first and second ends, each being connected near the respective first end to the correction knob and near the respective second end to said pivoting member, respectively arranged to couple movement in opposite respective directions of the correction knob to the pivoting member, and
   resilient means for tensioning said two tension members at said first ends so as to prevent slackening of the tension members, whereby lost motion in the azimuth-angle correction device is eliminated.

2. A player as claimed in claim 1 characterized in that said correction knob is rotatable, and said device includes first drum means coaxially connected to the correction knob, near their first ends the two tension members being wound about the drum means at least a part of one turn in senses opposite each other, and second drum means operably connected to said pivoting member, near their second ends the flexible members being respectively wound onto the second drum means for at least a part of a turn in senses opposite each other.

3. A player as claimed in claim 2 characterized in that said first drum means comprises two drums, each tension member being wound about a respective drum.

4. A player as claimed in claim 3 characterized in that said correction knob includes a spindle rotatable about a first axis, said two first drums being coaxial with the first axis and axially movable on the spindle, and
   the device further comprises a disc rigidly connected to said spindle coaxial with the first axis, said disc and said two first drums having confronting end surfaces,
   resilient means for urging said confronting end surfaces of the disc and the two first drums against each other in the axial direction, and
   means for rotationally coupling and decoupling said end surfaces to each other so as to enable the first drums to be rotated relative to each other and to said disc to align the correction knob to a neutral position when the read head is in a neutral position.

5. A player as claimed in claim 4 characterized in that said means for coupling comprises a multiplicity of radially extending ridges formed in said end surfaces, whereby upon slight axial displacement of the drums over a distance at least equal to the height of said ridges, the drums may be rotated relative to each other and the disc.

6. A player as claimed in claims 1, 2, 3, 4, or 5 characterized in that the pivoting member comprises a gear segment rotatable about a second axis, and
   the device further includes a pinion coaxially connected to said second drum means and rotatable about a third axis, said pinion meshing with said gear segment.

* * * * *